United States Patent
Tullis

(10) Patent No.: US 7,046,398 B2
(45) Date of Patent: May 16, 2006

(54) METHOD AND APPARATUS FOR DYNAMIC ADJUSTMENT OF PRINT QUALITY

(75) Inventor: Barclay J Tullis, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 850 days.

(21) Appl. No.: 09/819,167

(22) Filed: Mar. 27, 2001

(65) Prior Publication Data

US 2002/0140984 A1    Oct. 3, 2002

(51) Int. Cl.
    *H04N 1/40*    (2006.01)
(52) U.S. Cl. ............ 358/3.02; 358/3.22; 382/169; 382/172; 347/254
(58) Field of Classification Search ............ 382/168, 382/169, 172; 347/251, 254; 358/3.02, 358/3.22, 3.27
See application file for complete search history.

(56) References Cited

U.S. PATENT DOCUMENTS

| | | | | |
|---|---|---|---|---|
| 4,656,665 A | * | 4/1987 | Pennebaker | 382/172 |
| 5,144,566 A | * | 9/1992 | Anderson et al. | 382/112 |
| 5,576,811 A | | 11/1996 | Kobayashi | |
| 5,784,667 A | | 7/1998 | Mestha | |
| 6,771,815 B1 | * | 8/2004 | Yang et al. | 382/169 |
| 2001/0036314 A1 | * | 11/2001 | Yamaguchi et al. | 382/172 |

FOREIGN PATENT DOCUMENTS

| | | |
|---|---|---|
| EP | 0454479 | 10/1991 |
| EP | 0461338 | 12/1991 |
| EP | 0680198 | 11/1995 |

* cited by examiner

*Primary Examiner*—Thomas D. Lee

(57) ABSTRACT

A method and apparatus for adjusting a printer is disclosed. An area is printed over, and sensors are used to collect pixel values over the area. Then, metric criteria are applied against pixel values to determine whether or not to adjust the number-density of dots to improve print quality. The apparatus includes a print means, sensor, and processor. It may also include storage to store the pixel values.

21 Claims, 3 Drawing Sheets

Area 124 (White/Light Area)

Histogram 124
(Pixel values, Area 124;
Mean=189.6; Median=201)

Area 128 (Black/dark Area)

Histogram 128
(Pixel values, Area 128;
Mean=31.1; Median=32)

Area 126 (Gray)

Histogram 126
(Pixel values, Area 126;
Mean=110.35; Median=115)

METHOD AND APPARATUS FOR DYNAMIC ADJUSTMENT OF PRINT QUALITY

CROSS-REFERENCE TO RELATED APPLICATIONS

A co-pending application entitled "Dot Sensing, Color Sensing and Media Sensing by a Printer for Quality Control" is filed simultaneously with the present application and is incorporated herein.

BACKGROUND

The present invention relates to the art of dynamically adjusting print quality. More specifically, the present invention relates to the art of dynamically adjusting number-density of printed dots to control lightness/darkness and/or color.

For printers that print with dots, number-density of dots offers an important control variable in determining print quality. The printer can vary the number density of dots to produce a range of color values (lightness/darkness values) for a particular color ink. Size, dot-gain and optical density of ink dots are typically uncontrolled variables but can be compensated for by adjusting number-density of dots. The color of the medium can be considered an uncontrolled variable as well, but if its variation is known (by user determination or direct measurement), it can be somewhat compensated for in a like manner. Preferably, the printer is calibrated to print nothing to achieve light areas while sufficiently covering areas that are to be dark. A light area is defined here to mean a region on an output medium, for example generally white paper, on which no coverage is desired for a particular colored ink. A dark area is a region on the output medium where an effect of complete coverage is desired using the particular colored ink.

To present what appears to the user as a completely covered area on the output medium, the area need not be completely covered physically with ink. This is because human eyes cannot distinguish color densities beyond a determinable threshold. Thus, for a sufficiently complete coverage to achieve a dark area, dot density doesn't need to be beyond the determinable threshold we may refer to as the visual dark threshold. However, if the visual dark threshold is not reached for a dark area, then the dark area does not appear completely covered, and the print quality suffers. On one hand, if the number-density of dots for coverage of the dark area is less than the visual dark threshold, then the print quality is reduced. On the other hand, if the number-density of dots for coverage of the dark area is greater than the visual dark threshold, then ink or toner has been wasted on that area, and the printing time has been unnecessarily increased. Accordingly, the printer must be calibrated to print its dark regions at the number-density of dots corresponding to the visual dark threshold. This is even more important for color printing where dots of different fundamental colors are used together to produce a desired color output. If the dot number-density of any one of the fundamental colors is off calibration, then the resultant color may not be perceived as the desired color.

Traditionally, calibration of printers regarding number-density of dots is done prior to or during the manufacturing process. Once the printer is shipped, the printer is rarely, if ever, recalibrated. Such calibration may not account for the aforementioned uncontrolled variables or for specific calibration requirements of each individual printer. Moreover, number-density requirement(s) for dot number-densities to achieve a specified value of color (hue, value, chroma, etc.) are different depending upon the color of the medium onto which the printer places its ink, actual dot sizes, dot-gains and specifics of the ink being used.

Accordingly, there is a need for a technique and apparatus for dynamic adjustment of number-densities of dots by the printer.

SUMMARY

The need is met by the present invention. According to one aspect of the present invention, a method of dynamically adjusting a printer is disclosed. The method includes a first step of printing onto a medium and measuring imaged pixel values within images sensed over areas of the medium. Then, pixel values are collected over an area. Next, statistical metrics of histograms of the pixel values are calculated. Finally, the metric criteria are applied against the statistical metrics by adjusting print density.

According to another aspect of the present invention, a printing apparatus includes a printing means for printing on a medium, an image sensor, and a processor. The sensor collects pixel values over an area. The processor, connected to the sensor, calculates statistical metrics of histograms of the pixel values and applies metric criteria against the statistical metrics by adjusting print density.

Other aspects and advantages of the present invention will become apparent from the following detailed description, taken in combination with the accompanying drawing, illustrating by way of example the principles of the invention.

DETAILED DESCRIPTION

Figure 1:
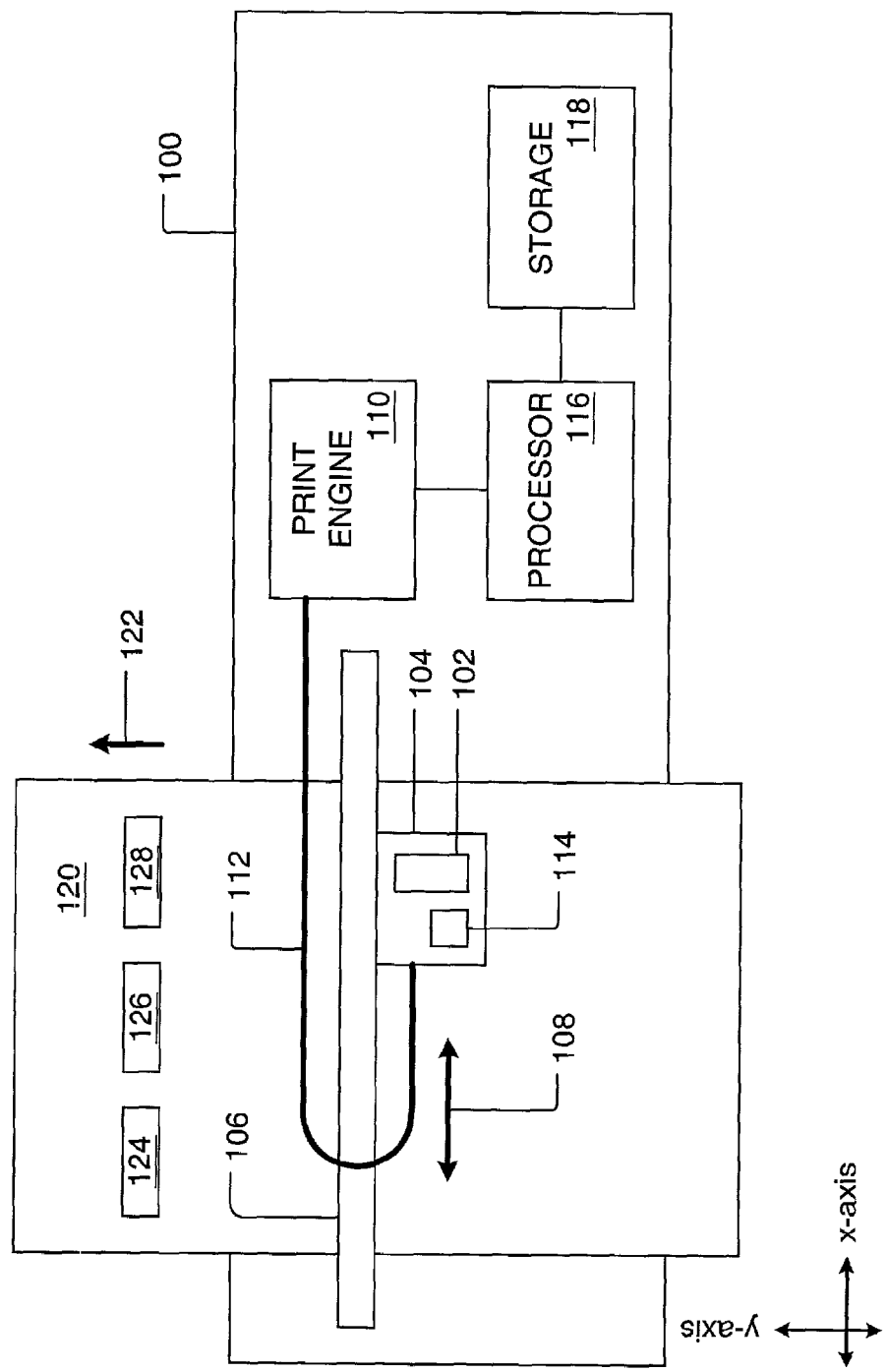
FIG. 1 is a simplified block diagram illustrating a printing apparatus according to one embodiment of the present invention.

As shown in the drawings for purposes of illustration, the present invention is embodied in a technique of dynamically adjusting a printer, and a printing apparatus including components for dynamically adjusting dot density of the printer. Because the printer dynamically adjusts its dot densities, it produces correct colored outputs, even on colored media or media having different levels of hue, for maximum print quality. In addition, a minimum amount of ink or toner is used for each color thereby minimizing cost of consumed ink.

Referring to FIG. 1, a printing apparatus 100 in accordance to one embodiment of the present invention is disclosed. The printing apparatus 100 includes a print head 102 mounted on a carriage 104 which is attached to a carriage transport mechanism 106. Directed line 108 indicates the directions of movement of the carriage 104 relative to the stationary carriage transport mechanism 106. The print head 102 is controlled by a print engine 110 connected to the carriage 104 and to the print head 102 via a flexible cable 112. In one embodiment, the print head 102 is an ink jet print head that prints by ejecting tiny dots onto a medium 120 such as paper. Directed line 122 indicates the direction of movement of the medium 120 relative to the printing apparatus 100.

Also mounted on the carriage 104 is a sensor 114. As the carriage 104 moves over the medium 120 in the direction of the x-axis, and the medium 120 moves through the printing apparatus 100 in the direction of the y-axis, various areas of the medium 120 pass under the sensor 114 and the print head 102. The sensor 114 senses, or collects, pixel values over an area of the medium 120. Resolution of the sensor 114 is preferably sufficiently great to resolve individual ink dots which may be tens of microns across, or even smaller.

The collected pixel values may be delivered to a processor 116 connected to the print engine 110 which, in turn, is connected to the sensor 114 via the flexible cable 112. The method and apparatus for dynamically sensing dots and collecting pixel values from a print medium is disclosed in a co-pending patent application entitled "Dot Sensing, Color Sensing and Media Sensing by a Printer for Quality Control" and filed simultaneously herewith. Although not limited thereto, one embodiment of the present invention employs the method and the apparatus disclosed therein, and the co-pending application is incorporated herein by reference.

Figure 2A:
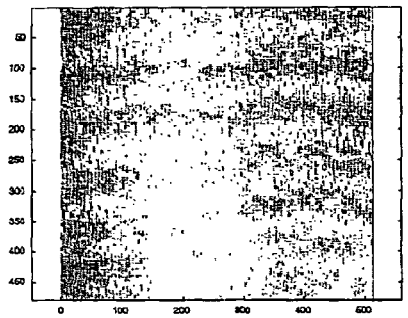
FIG. 2A depicts a light/white area of a printed medium, according to an embodiment.
Figure 2B:
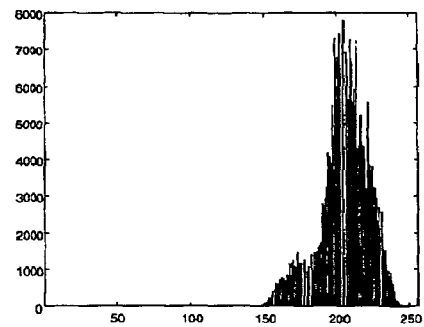
FIG. 2B depicts a histogram of pixel values for the light/white area depicted in FIG. 2A.

The area can be a predetermined region, of predetermined size, or both. Alternatively, the area can be dynamically determined as a portion of the medium 120 printed on by the printing apparatus 100. Referring to FIG. 2A, Area 124 represents a light/white area of approximately two square millimeters on a white paper (not printed) scanned with a sensor array having 8-bit pixel values for each sensor element in the array. Thus, the pixel values range from a zero (completely dark, no reflection) to 255 (maximum light reflection, $255=2^8-1$). Referring to FIG. 2B, the collected pixel values for Area 124 are displayed in a histogram format by Histogram 124 having its x-axis as the pixel values and the y-axis as the number of pixels in Area 124 having a given pixel value.

Figure 3A:
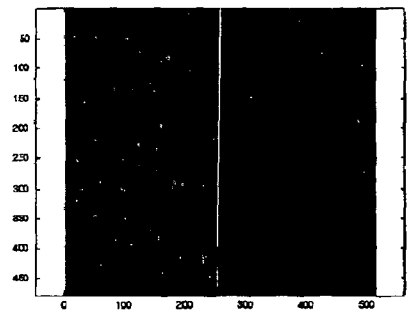
FIG. 3A depicts a black/dark area of a printed medium, according to an embodiment.
Figure 3B:
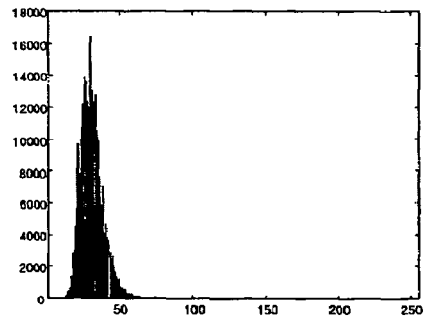
FIG. 3B depicts a histogram of pixel values for the black/dark area depicted in FIG. 3A.

Referring to FIGS. 3A and 3B, Area 128 represents another area, meeting color density for the visual dark threshold, with the collected pixel values illustrated as Histogram 128.

Note that for each of the histograms illustrated as Histogram 124 and Histogram 128, as shown in FIGS. 2B and 3B, respectively, a set of metrics, or measurements, can be taken. For instance, in the white/light area (Area 124), shown in FIG. 2A, the median pixel value is 201 and for the black/dark area (Area 128), shown in FIG. 3A, the median pixel value is 32. There are many metric criteria that can be applied to the collected set of pixel values to determine metrics or measurements, of image density for the purposes of determining printing quality and adjusting the print density to increase the printing quality. These metric criteria include, for example, mean pixel value, variance pixel values, standard deviation of pixel values, ratio between the mean and the median pixel values, ratio of the number of pixels above the mean to the number of pixels below the mean, etc. Many other statistical metrics can be defined and used.

Metric criteria are applied to the collected pixel values by first determining measurements of image density from the collected pixel values, then comparing the measurements against reference measurements or other predetermined criteria. For instance, suppose a dark area (not shown in FIG. 1) on the medium 120 is printed, pixel values are collected by the sensor 114, and the pixel values yield a mean value of 27 and median of 29. The mean value of 27 and the median of 29 for the dark area 126 indicate that the density of the dark area is greater than the visual dark (or black) threshold which, in the current example has mean of 31.1 and median of 32). See Area 128 and Histogram 128 shown in FIGS. 3A and 3B, respectively. Accordingly, the processor 116 may signal the print engine 110 to reduce print density for dark areas. For another case, the processor 116 may signal the print engine 110 to increase print density for dark areas.

In an alternative embodiment of the present invention, the measurements of the image densities of the light and dark areas may be shifted and scaled (normalized) into a predetermined range for use by the print engine 100. In the present example, referring to FIGS. 2B and 3B, respectively, the light area 124 mean pixel value of 189.6 and the dark area 128 mean of 31.1 can be shifted and normalized into a 100 point scale from zero to 99. Then, the scaled measurement of the image density can be used against scaled reference criteria to determine the correct number densities at which to print dots.

Figure 4A:
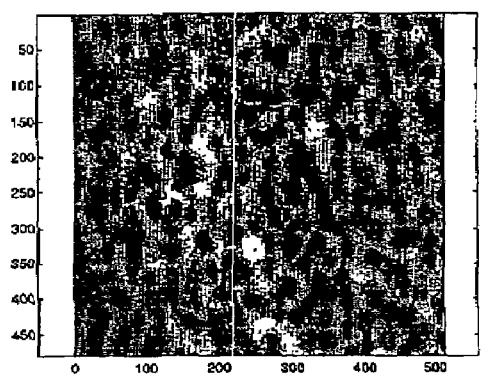
FIG. 4A depicts a gray area of a printed medium, according to an embodiment.
Figure 4B:
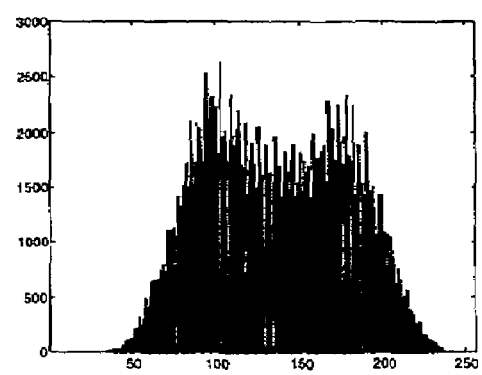
FIG. 4B depicts a histogram of pixel values for the gray area depicted in FIG. 4A.

The scaled measurements and the scaled references account for various media. For example, referring to FIGS. 4A and 4B, for the medium 120 having a light or white area density mean of 189.6 and dark or black area density mean of 31.1, to print a gray area 126 having 50% dot density (scaled density of 50), desired mean of the pixel values is set at 110.35 (=[189.6+31.1]/2) which is at the midpoint between the light area mean and the dark area mean. FIGS. 4A and 4B show Area 126 and Histogram 126, respectively. Area 126 and Histogram 126 illustrate a nearly 50% covered area and its pixel values. Area 126 refers to area 126 as shown in FIG. 1 and FIG. 4A.

Referring to FIG. 4B, an interesting characteristic of the pixel values of Area 126 as illustrated by Histogram 126 is its bimodal property. In Histogram 126, higher signal (lighter) mode, or peak, is formed around pixel value of approximately 180 and the lower signal (darker) mode, or peak, is formed around pixel value of approximately 95. In some implementations of the present invention, as the density increases (causing the average visual effect of darker and darker image), two different trends develop. First, as the image darkens, more pixels take on weaker (darker) pixel amplitudes. Second, as the images darken, dominant pixel population shifts from the first mode (at the higher (lighter) pixel values) to a second mode (at a lower (darker) pixel value) and a roughly bimodal distribution eventually occurs in a predictable manner.

As initial dots are printed within an area, the single mode associated with light (white) unprinted image histograms is replaced by a bimodal distribution. As dot densities continue to increase, a third and even fourth mode can appear at still darker pixel values, representing the overlay of dot-on-dot and dot-on-dot-on-dot printing, respectively. At still higher dot densities, the mode corresponding to light pixel values decreases in amplitude until it disappears. As full coverage is approached, only a single mode remains corresponding to a dark (or black) threshold. It is a part of this invention to distinguish optical densities by using measurement and reference criteria based upon the number, relative heights, and positions of peaks in pixel count histograms of imaged areas. In particular the condition of greatest symmetry between the two peaks at a nominal 50% print density is uniquely recognizable (detectable) as the condition when the mean and median of pixel values are equal. This represents a calibration point, also called a bimodal symmetry point, that is robust to many of the uncontrolled variables that are detrimental to calibration techniques based upon calibrated energy or power measurements. Another particular aspect of this invention is the ability to recognize the point at which enough ink has been printed to equal or exceed the dark threshold, that point being when only a single mode remains of dark pixel values. Comparing the relative heights of modes (light modal peak and the dark modal peak) in the histograms provides piecewise continuous measurement of optical density as density increases with more and more dots printed in a given area.

The present technique is also useful for high quality printing on a colored medium or media of varying reflectance. For example, a medium (not shown in a Figure) having a lower reflectance may have light or white area density mean of 120. In that case, desired mean of the pixel values for a gray area (50% of the visual dark or black threshold) can be set to 75.55 (=[120+31.1]/2) using the visual dark threshold density value of 31.1.

Continuing to refer to FIG. 1, in the illustrated embodiment of the present invention, storage 118 is connected to the processor 116. The storage 118 can be used to store the collected pixel values, criteria for application, instructions for the processor 116 to perform its functions, or any combination of these. Because the print head 102 and the sensor 114 are mounted on the same carriage 104 and controlled by the same print engine 110 and the processor 116, the steps of printing by the print head 102 and the collection of pixel values by the sensor 114 may be performed simultaneously or substantially simultaneously. That is, when the carriage 104 is moving in a first direction (left to right in the illustrated example), the print head 102 may print over an area and the sensor 114, moving over the just-printed area, can collect pixel values over that area. The entire process of printing and collection of the pixel values may take merely seconds or even less.

The printing apparatus 100 may use stealthy dots for calibration purposes. Stealthy dots are dots purposefully printed in regions of a medium where no final content is directed, or in regions that may get covered over after the stealthy dots are measured. The concept of stealthy dots derives from the fact that modern dot-oriented printers such as ink-jet printers, can use dots that are so small individually that those dots, when relatively isolated within an otherwise unprinted region, are virtually undetectable by unaided human eyes. A region may be printed with stealthy dots and pixel values collected over the region to determine the pixel value metrics under a defined density. Then, the comparison may be made to adjust the densities of various hues.

From the foregoing, it will be appreciated that the present invention is novel and offers advantages over the current art. In summary, the present invention provides a technique and an apparatus for dynamically controlling or adjusting dot density of printers. Using the present invention my result in higher quality print output and cost savings. Although a specific embodiment of the invention is described and illustrated above, the invention is not to be limited to the specific forms or arrangements of parts so described and illustrated. For example, the present invention method may be used to produce intentionally off-colored output. Such technique may be used for special effects using the printer. The invention is limited only by the claims that follow.

What is claimed is:

1. A method of dynamically adjusting a printer, the method comprising:
   printing onto a medium;
   collecting pixel values over an area of the medium;
   calculating statistical metrics of histogram of the pixel values;
   applying metric criteria against the statistical metrics, wherein the metric criteria is relative height of a dark modal peak to that of a light modal peak to determine degree of adjustment of the print density; and
   adjusting print density based upon the application of the metric criteria against the statistical metrics.

2. The method recited in claim 1 wherein the printer prints with dots.

3. The method recited in claim 1 further comprising purposefully printing stealthy dots.

4. The method recited in claim 1 wherein the collected pixel values are shifted and scaled.

5. The method recited in claim 1 wherein the printing and the collection of pixel values are performed substantially simultaneously.

6. The method recited in claim 1 wherein the step of applying metric criteria comprises steps of determining optical density over the area and of comparing optical density to a predetermined density.

7. The method recited in claim 1 wherein the step of adjusting print density further comprises a step of adjusting print density to a visual dark threshold determined as median of the pixel values when a single dark mode remains in the histogram.

8. A method of dynamically adjusting a printer, the method comprising:
   printing onto a medium;
   collecting pixel values over an area of the medium;
   calculating statistical metrics of histogram of the pixel values;
   applying metric criteria against the statistical metrics; and
   adjusting print density based upon the application of the metric criteria against the statistical metrics, wherein the applied metric criteria is bimodal symmetry where median of the pixel values equals mean of the pixel values.

9. The method recited in claim 8 wherein the step of adjusting print density further comprises a step of adjusting print density based on the bimodal symmetry point as 50% of visual dark threshold.

10. The method recited in claim 8 wherein the step of adjusting print density further comprises a step of adjusting print density to a visual dark threshold determined as median of the pixel values when a single dark mode remains in the histogram.

11. A printing apparatus comprising:
    printing means for printing on a medium;
    a sensor for collecting pixel values over an area of the medium; and
    a processor, connected to the sensor, for calculating statistical metrics of histogram of the pixel values, applying metric criteria against the statistical metrics, wherein the metric criteria is relative height of a dark modal peak to that of a light modal peak to determine degree of adjustment of the print density, and adjusting print density based upon the application of the metric criteria.

12. The apparatus recited in claim 11 wherein the printer prints using dots.

13. The apparatus recited in claim 11 further comprising storage for storing the collected pixel values.

14. The apparatus recited in claim 11 wherein the area contains dots purposefully printed in regions of a medium where no final content is directed.

15. The apparatus recited in claim 11 wherein the processor shifts and scales the pixel values.

16. The apparatus recited in claim 11 wherein the printing means and the sensor operate substantially simultaneously.

17. The apparatus recited in claim 11 wherein the processor further applies the metric criteria by determining optical density over the area and of comparing the optical density to a predetermined density.

18. The apparatus recited in claim 11 wherein the print density is adjusted to a visual dark threshold determined as median of the pixel values when a single dark mode remains in the histogram.

19. A printing apparatus comprising:
printing means for printing on a medium;
a sensor for collecting pixel values over an area of the medium; and
a processor, connected to the sensor, for calculating statistical metrics of histogram of the pixel values, applying metric criteria against the statistical metrics, and adjusting print density based upon the application of the metric criteria, wherein the applied metric criteria is bimodal symmetry where median of the pixel values equals mean of the pixel values.

20. The apparatus recited in claim 19 wherein the print density is adjusted based on the bimodal symmetry point as 50% of visual dark threshold.

21. The apparatus recited in claim 19 wherein the print density is adjusted to a visual dark threshold determined as median of the pixel valves when a single dark mode remains in the histogram.

* * * * *